US012494129B2

(12) United States Patent
Switkes et al.

(10) Patent No.: US 12,494,129 B2
(45) Date of Patent: Dec. 9, 2025

(54) SYSTEMS AND METHODS FOR ANALYZING VEHICLES

(71) Applicant: Peloton Technology, Inc., Mountain View, CA (US)

(72) Inventors: Joshua Switkes, Mountain View, CA (US); Evan Nakano, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 1201 days.

(21) Appl. No.: 16/504,590

(22) Filed: Jul. 8, 2019

(65) Prior Publication Data
US 2020/0013292 A1  Jan. 9, 2020

Related U.S. Application Data

(60) Provisional application No. 62/695,181, filed on Jul. 8, 2018.

(51) Int. Cl.
G08G 1/00 (2006.01)
B60W 30/165 (2020.01)
G05D 1/00 (2024.01)
H04W 4/46 (2018.01)

(52) U.S. Cl.
CPC ............. *G08G 1/22* (2013.01); *B60W 30/165* (2013.01); *G05D 1/0293* (2013.01); *H04W 4/46* (2018.02); *B60W 2554/4041* (2020.02)

(58) Field of Classification Search
CPC ............ B60W 30/165; B60W 2556/65; G05D 1/0293; G08G 1/22
See application file for complete search history.

(56) References Cited

U.S. PATENT DOCUMENTS

| | | | |
|---|---|---|---|
| 2013/0041576 A1* | 2/2013 | Switkes | G05D 1/0293 701/123 |
| 2016/0200320 A1* | 7/2016 | Nemoto | B60W 30/16 701/96 |
| 2018/0188745 A1* | 7/2018 | Pilkington | G05D 1/0295 |
| 2018/0188746 A1* | 7/2018 | Lesher | G05D 1/0287 |
| 2020/0301444 A1* | 9/2020 | Sujan | G08G 1/22 |
| 2021/0294351 A1* | 9/2021 | Wiberg | G05D 1/0295 |

* cited by examiner

Primary Examiner — Anshul Sood
(74) Attorney, Agent, or Firm — Redbrick IP, P.C.

(57) ABSTRACT

Systems and methods are described for determining whether a platooning system is safe. In various aspects, a platooning system may collect information from various sensors included on one or more vehicles, and use the gathered information to determine whether the system achieves a threshold amount of safeness is achieved. In response to determining that a vehicle is unsafe, a system may prohibit vehicles from platooning or cause platooning vehicles to end their current platooning session.

6 Claims, 15 Drawing Sheets

Collision Analysis: Scenario Assumption Sets

SCENARIO 1

The following Assumption Sets were used in Scenario 1 Simulations:

- Assumption Set A – Systems to Systems:
  - Baseline simulation case comparing min gap to ACC+AEB w/o Driver
- Assumption Set B – Driver Models:
  - Compares Platoon w/ Min gap to ACC+AEB with various Driver Models
- Assumption Set C – Cut-In Models:
  - Attempts to simulate performance in select cut-in scenarios All Sets assume 6.5 mpph unless explicitly stated otherwise

SCENARIO 2

The following Assumption Sets were used in Scenario 2 Simulations:

- Assumption Set A – Systems to Systems:
  - Baseline simulation case comparing min gap to ACC+AEB w/o Driver
- Assumption Set B – 1g Driver Models:
  - Compares Platoon w/ Min gap to ACC+AEB with various Driver Models
- Assumption Set C – 1g Various Min Gap, PRD, or Init. Speeds:
  - Compares to various Platoon settings to encourage Driver model
- Assumption Set D – Select 2g Scenarios:
  - Select 1g scenarios conducted at 2g All Sets assume 6.5 mpph unless explicitly stated otherwise

FIGURE 8

Collision Analysis: Modeling the driver

Use data from "*Naturalistic Study of Truck Following Behavior - Final Report, April 2016*"[1], as reference for modeling Driver behaviors.

- Mean Follow distance and Headway:
  - 47.6m, 1.9s
- Mean Crash Avoidance Braking Level:
  - 0.4g with standard dev of 0.1g
- Mean Driver Reaction Times:
  - Medium reaction 1.21s with standard deviation of .3s
  - Slow reaction of 1.88s with standard deviation of .3s Driver brake models:

- Delayed Collision Recognition:
  - Assumes driver reaction times triggering off of AEB
  - Assumes driver is applies .7g capacity braking

- Fast Collision Recognition –
  - Assumes driver recognition and reaction to lead truck braking situation.
  - Assumes Mean Crash Avoidance Braking levels of .4g (mean) and .5g (mean+std dev)

FIGURE 9

Platoon Safety Feature Summary

PELOTON TECHNOLOGY

| Condition | Core Platoon Safety Features |
|---|---|
| System Manages Dissolves or Prohibits Platooning | Front vehicle detects close traffic within 1 second headway, ie. Platoon proximity Dissolve. |
| | Front vehicle braking beyond 0.3g |
| | Traffic cut-in between platooning vehicles |
| | System detects DSRC signal degradation or signal lost |
| | System detects any Peloton system faults |
| | System detects any missing/stale messages from BECU, ACC, EECU (including retarder), TECU, VECU (including CC) |
| | Platoon is laterally offset in different lanes for more than 20 secs. |
| | Wrong software or non-sister vehicle platoon configurations |
| | Bendix initiates dissolves when XBR or FPV2 heartbeat is not reporting or when D/D or brake pedal apply is not working |
| | Unapproved road types, unfavorable road weather conditions detected by the Peloton cloud, driver or Peloton personnel |
| | Incorrect ordering of the platoon vehicles |
| | Driver initiated |

FIGURE 10

PELOTON TECHNOLOGY Conditional Approval Proposed for CAT/P3OP

| Condition | Operational Constraints | System Enable | Fast Condition | Approach to Lead |
|---|---|---|---|---|
| Tractor | Peloton Configured Vehicles Kenworth (T680), Volvo (VNL 427), Peterbilt, Navistar, and Navistar Customs | ■ | | ■ |
| | Equipped and Functional ABS, Include Bendix Braking System | ■ | | ■ |
| | Disc Brakes (All Axles) & ACC (Bendix Wingman Fusion) | ■ | | ■ |
| | Sister Vehicles Only | | ■ | ■ |
| | Tires (broken-in tires) | | ■ | |
| | Trained Driver | ■ | | ■ |
| Trailer/Dolly | Trailer: 53', 29', 28' Doubles. (Any combos except 28' doubles behind 53's) | ■ | | ■ |
| | GCVW: up to 80,000 lbs | | | ■ |
| | Equipped and Functional ABS | | ■ | |
| | Brakes: Drum Brakes Only | | ■ | |
| | All Legal Axle Loadings per FMCSA standards | | | |

FIGURE 11

PELOTON TECHNOLOGY Conditional Approval Proposed for CAT/P3OP

| Condition | Operational Constraints | System Enforce | Fleet Commitment | PT Personnel Verify |
|---|---|---|---|---|
| Environmental | Dry Pavement Only (no snow/ice/rain) | | | |
| | No Platooning Through Construction Zones | | | |
| | All Hours of Operation | | | |
| | Operate in Texas and Tennessee | | | |
| | Platoon Max Speed: 65 mph (front vehicle) | | | |
| | Road Type: Controlled Access, Divided, Multi-Lane | | | |

FIGURE 13

| Condition | Operation Logistic Requirements | System Enforced | Fleet Commitment | PT Personnel (xxx) |
|---|---|---|---|---|
| C&T Monitoring | Tractor/Trailer Pre/Post Trip Inspection (PT Checklist ex. Tires, Brakes, ABS) | | ■ | ■ |
| | Daily Weather and Traffic Monitoring on Platoon Roads | | | ■ |
| | Daily Platoon Incident Review and Triage | | ■ | ■ |
| | Daily Log File Review | | | ■ |
| | Spot Check Tractor/Trailer Maintenance Record Inspection | | ■ | ■ |
| | Monitor for Trained/Certified Drivers to Platoon | | ■ | |
| | Bendix - SafetyDirect Data Collection | ■ | | |

FIGURE 14

PELOTON TECHNOLOGY Conditional Approval Proposed for CAT/P3OP

| Condition | Operational Constraints & Testing Required Prior to CATP3OP | | | |
|---|---|---|---|---|
| Product Testing Completed | Bendix/Peloton Agreed Test Set To Date (tire/brake/gap/system) | | | |
| | Peloton Design & Verification | | | |
| | Peloton Manufacturing Test & Diags, FCC, Carrier Certification | | | |
| | End-to-End (In-vehicle/Cloud App) Product QA | | | |
| | V&V Testing<br>• All FSC/FSR, TSC/TSR<br>• Peloton 10K Platoon Mileage Accumulation | | | |
| System Gap Setting | Gap range is determined based on the gap setting statistical approach.<br>The gap goal: Set at a distance such that the likelihood of collision is less than that of a non platooning vehicle. | | | |
| | Gap setting - pending final brake characterization results | | | |

FIGURE 15

SYSTEMS AND METHODS FOR ANALYZING VEHICLES

CROSS-REFERENCE TO RELATED APPLICATIONS

This application claims priority of U.S. Provisional Patent Application No. 62/695,181 filed Jul. 8, 2018, which is herein incorporated by reference in its entirety for all purposes.

BACKGROUND

Controlling vehicles using vehicle-to-vehicle communication has been a challenging task for many decades now. While many enterprises have tried to create vehicles that can be controlled remotely, many have failed due to the complexity of the systems at play. While a toy car may not be difficult to assemble, building a large vehicle for use on public roads can be a daunting task. For example, vehicles may need to utilize some type of computer vision, such as camera, radar, or LIDAR, to prevent accidental collisions. In some systems, various vehicle dynamics come into play and a precise system must know the weight of a vehicle, a vehicle's wheelbase, a vehicle's suspension, etc.

As governments are becoming more receptive to allowing vehicles with some level of automation drive on public roads, companies are being asked to provide safety information about their vehicles. To provide safety information, various companies and institutions are developing ways to test and analyze their vehicles.

Thus, devices, methods, and systems described herein provide improvements in the art by analyzing various attributes associated with controlling one or more vehicles, including a platoon of vehicles, more precisely than systems currently available in the art.

BRIEF DESCRIPTION OF THE DRAWINGS

In order to describe the various aspects of the present disclosure, some detailed description now will be provided, by way of illustration, with reference to the accompanying drawings, in which:

FIG. 8 illustrates information used to determine the safety of a vehicle, in accordance with some embodiments;

FIG. 9 illustrates information used to determine the safety of a vehicle, in accordance with some embodiments;

FIG. 10 illustrates information used to determine the safety of a vehicle, in accordance with some embodiments;

FIG. 11 illustrates information used to determine the safety of a vehicle, in accordance with some embodiments;

FIG. 13 illustrates information used to determine the safety of a vehicle, in accordance with some embodiments;

FIG. 14 illustrates information used to determine the safety of a vehicle, in accordance with some embodiments; and FIG. 15 illustrates information used to determine the safety of a vehicle, in accordance with some embodiments.

DETAILED DESCRIPTION

Figure 1:
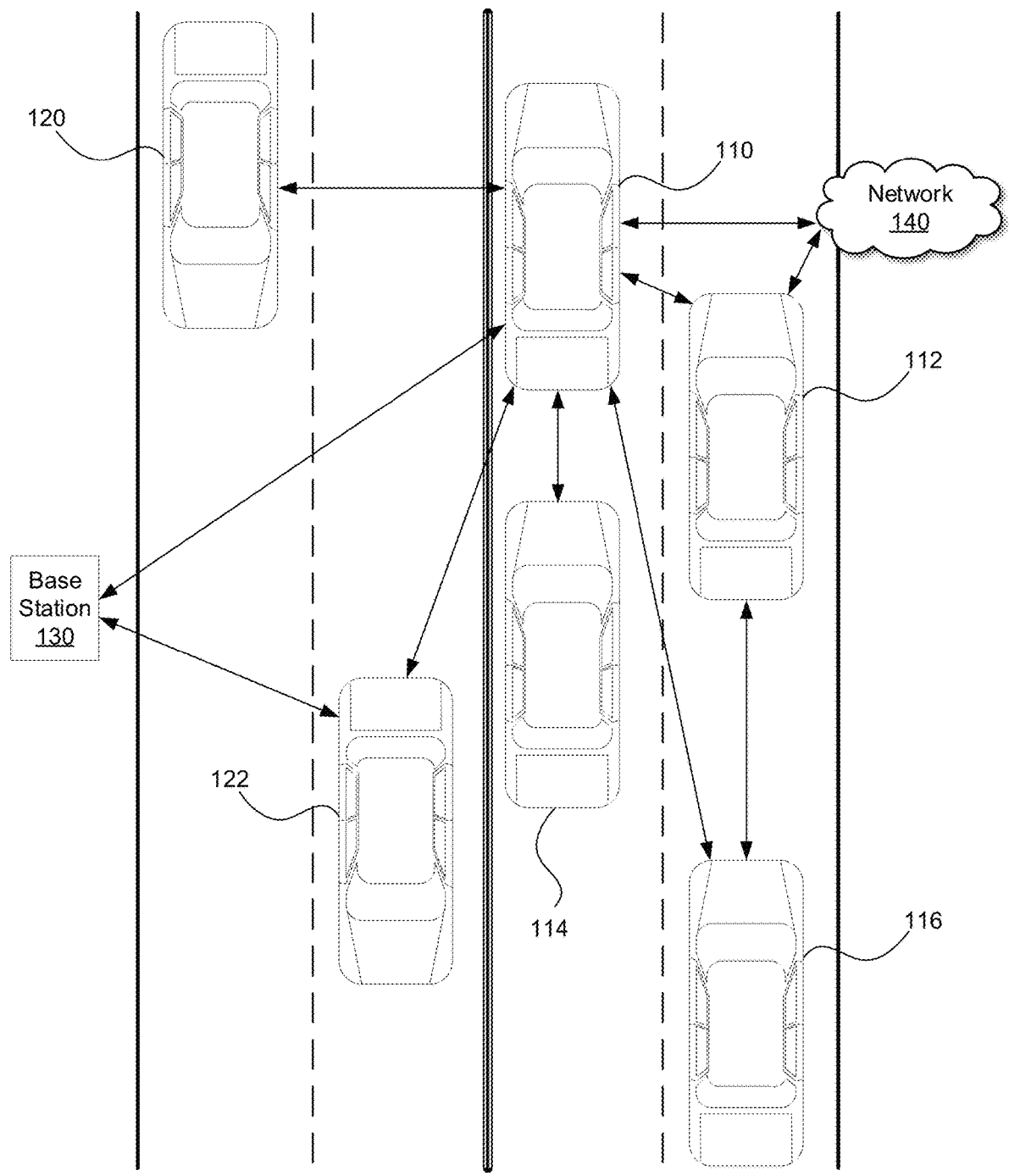
FIG. 1 illustrates a diagram of vehicles transmitting data, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practiced without implementing all of the features disclosed herein.

The Applicant has proposed various vehicle communication systems in which a second, and potentially additional, vehicle(s) is/are automatically, or semi-automatically, controlled in response to receiving instructions from a first vehicle. By way of example, U.S. patent application Ser. No. 16/029,625 (filed today, Jul. 8, 2018), Ser. Nos. 15/605,456, 15/607,902; 13/542,622 and 13/542,627; U.S. Provisional Patent Application Nos. 62/377,970, and 62/343,819; and PCT Application Nos. PCT/US2014/030770, PCT/US2016/049143 and PCT/US2016/060167 describe various vehicle systems in which a recipient vehicle is at least partially controlled by a provider vehicle (e.g., a recipient vehicle is a vehicle that receives data from a provider vehicle, but it should be understood that a recipient vehicle can send data to a provider vehicle). Some of these applications describe platooning, wherein at least one vehicle follows closely behind another. In such cases, a recipient vehicle may be referred to as a trailing vehicle and/or a rear vehicle, and a provider vehicle may be referred to as a lead vehicle and/or a front vehicle. Each of these earlier applications is incorporated herein by reference in their entirety.

For the purposes of this application, the subtle yet important difference between controlling and commanding should be understood. Herein, the term commanding may be used to signify an action where a device is ordered to do something, while controlling refers to device supervision and/or adjustment. For example, an engine may be commanded to provide 2,000 N·m as opposed to controlling, where an engine ensures 2,000 N·m is being provided while potentially taking other variables into account and adjusting as needed such that the engine is substantially (e.g., for the most part/about/close to) providing a particular amount of torque, which in this case would be substantially 2,000 N·m. Herein, if a system can command and/or control, the term command/control may be used.

In some embodiments described herein, a vehicle may essentially command/control some or all of the functions of another vehicle using V2V communications. Research in the field of V2V communications has increased in recent years. In some embodiments herein, a recipient vehicle controlled by a provider vehicle will receive data from the provider vehicle including drive-by-wire commands. For example, a provider vehicle may send data wirelessly to a recipient vehicle, wherein the sent data causes the recipient vehicle to apply a certain amount of throttle. As another example, a provider vehicle may send data to more than one vehicle (e.g., broadcast data), and such data may command/control vehicles. For example, one vehicle may provide data to more than one other vehicle causing the receiving vehicles to apply their brakes.

As discussed above, in some instances providing instructions to command/control a throttle pedal, brake pedal, or steering wheel may not provide a desired amount of precision. For example, in some cases controlling the location of a throttle pedal may be less precise than commanding/controlling an engine ECU such that the engine produces a certain amount of torque. Similarly, in some systems commanding/controlling an engine ECU, brake ECU, and/or retarder ECU may cause an amount of torque (e.g., engine gross torque, engine net torque, wheel torque) to be provided that is more precise than a system that merely controls the location of an accelerator pedal and a brake pedal. For example, a system controlling a truck traveling downhill may benefit by being able to control torque using an engine ECU, break ECU, and/or retarder ECU.

Herein, the term torque is used broadly to mean any portion of a system that may affect the torque of a vehicle, unless explicitly stated otherwise. For instance, the term torque may be used to describe, at least: (1) engine gross torque, (2) engine net torque, (3) wheel torque from an engine, and (4) wheel torque from braking. Further, each of these may include gear/transmission/shifting information, and various types of torque may be combined (e.g., wheel torque from an engine and wheel torque from braking may be combined and referred to as wheel torque).

At a high level, torque is a rotational force. An engine's gross torque, as an example, is the twisting force that an engine can produce before parasitic losses from the drivetrain (although, in some embodiments, an engine's gross torque may be an amount of force applied by pistons to a drive shaft). An engine's net torque, for example, may be the definition used by SAE standards J1349 and J2723, and may be the torque from an engine, measured at the same location as the gross torque (e.g., after the flywheel), when the engine is equipped with some or all of the parts necessary for actual engine operation (e.g., when an engine is actually installed in a vehicle). An engine's torque is transmitted through a gearbox, where it is multiplied with a gear ratio of an engaged gear, and produces a gearbox torque. It should be understood that commanding/controlling torque, as described herein, can apply to electric vehicles, including electric vehicles that may employ multispeed gearing (e.g., a transmission capable of shifting gear ratios). Next, torque can be measured at a differential, which then sends torque in multiple directions to the wheels. In some embodiments various amounts of torque are actively directed to one or more wheels (e.g., commanding/controlling torque using a differential such as a limited-slip differential). The amount of torque directed to any particular wheel/set of wheels may be determined based on attributes of a vehicle such as weight, the balance of a load, brake attributes, etc. Rotational force on a wheel may be referred to as wheel torque (e.g., when torque from an engine, retarder, or foundation brake reaches a vehicle's wheel). Wheel torque from an engine typically forces a vehicle to move forward (or backward if in reverse), or accelerate or decelerate if already in motion. However, wheel torque from a brake (e.g., a foundation brake) dampens wheel torque from an engine, and thus provides torque in an opposite direction from the engine torque. Since torque is a sum of all the individual torques acting on an object, wheel torque may be a combination of engine torque, brake torque, and/or any other torques applied.

Thus, herein, the term torque can be used to describe, at least: (1) the gross torque of an engine (e.g., the torque an engine can produce before loss from the drivetrain), (2) the net torque of an engine (e.g., the torque of an engine as it would be when installed in a vehicle including stock ignition timing, fuel delivery, exhaust systems, and accessories), (3) wheel torque (e.g., from an engine, from braking, a combination of the two), and (4) any of the torques described above with or without gear/shifting information (e.g., torque multiplied by a gear ratio or an amount of change of torque when a gear ratio changes).

In some embodiments, commanding/controlling torque may assist with platooning. When platooning, one goal is to maintain a desired position between vehicles. This position may be based on time and/or distance (e.g., time, distance headway). Thus, it should be appreciated herein that maintaining a position or gap may refer to a time and/or distance. Unless stated otherwise, references to a position or gap may refer to either a distance between two vehicles and/or an amount of time. In addition, while the term maintain is used throughout this disclosure, maintaining may mean staying within a position/gap, staying at a position/gap, and/or staying outside of a position/gap from another vehicle. Further, in some cases a desired position may be a relative distance and/or angle. Herein, a "target gap" may be a desired gap between a trailing vehicle (e.g., a rear vehicle) and a vehicle in front of the rear vehicle (e.g., a lead vehicle). The vehicles involved in a platoon will typically have sophisticated control systems suitable for initiating a platoon, maintaining the gap under a wide variety of different driving conditions, and gracefully dissolving the platoon as appropriate. Dissolving a platoon may comprise ending a platoon, and/or causing a gap between vehicles to increase such that they are traveling at a safe distance.

In some embodiments, a gap is maintained by using vehicle-to-vehicle (V2V) communications to transmit information from a lead vehicle to a rear vehicle. This information may include radar information indicating the current gap between two vehicles, along with information indicating the speed of the lead vehicle. With this information, along with a target gap, a rear vehicle can apply throttle or brakes such that the current gap is equal to the target gap.

Similarly, in some embodiments a rear vehicle may receive steering and speed information from a lead vehicle. Steering information may include a current direction, a target direction, and/or a speed at which steering is changing (e.g., 0.5 degrees/second). With this information, along with current gap and speed information, a rear vehicle can steer such that it begins changing direction in the same direction and at the same location that the lead vehicle changed direction.

Better yet, in some more advanced embodiments, instead of controlling a throttle and brake to maintain a gap, a rear vehicle may provide information to its electronic control units (ECUs) to ensure that the current gap is equal to the target gap. For example, a platoon electronic control unit (platoon ECU, PECU, or platoon system) may provide input to one or more of a brake ECU, an engine ECU, a retarder ECU, a transmission ECU, and a chassis ECU to control a gap better than by controlling a throttle and brake. In some embodiments, a chassis ECU may control and/or monitor other ECUs such as an engine ECU, a brake ECU, etc.

FIG. 1 illustrates a diagram of vehicles transmitting data, in accordance with some embodiments. FIG. 1. depicts multiple vehicles 110, 112, 114, 116, 120, and 122. FIG. 1 also depicts a base station 130 and a network 140. In various embodiments, vehicle 110 may transmit data (also referred to as information) to other vehicles 112, 114, 116, 120, and 122 directly, via base station 130, and/or via network 140. Vehicle 110 may also receive data from other vehicles 112, 114, 116, 120, and 122 directly, via base station 130, and/or via network 140. In some embodiments, a vehicle (e.g., vehicle 112) may retransmit information received from a first vehicle (e.g., vehicle 110) to another vehicle (e.g., vehicle 116) with or without additional information (e.g., information generated at vehicle 112 in addition to information received from vehicle 110).

Figure 2:
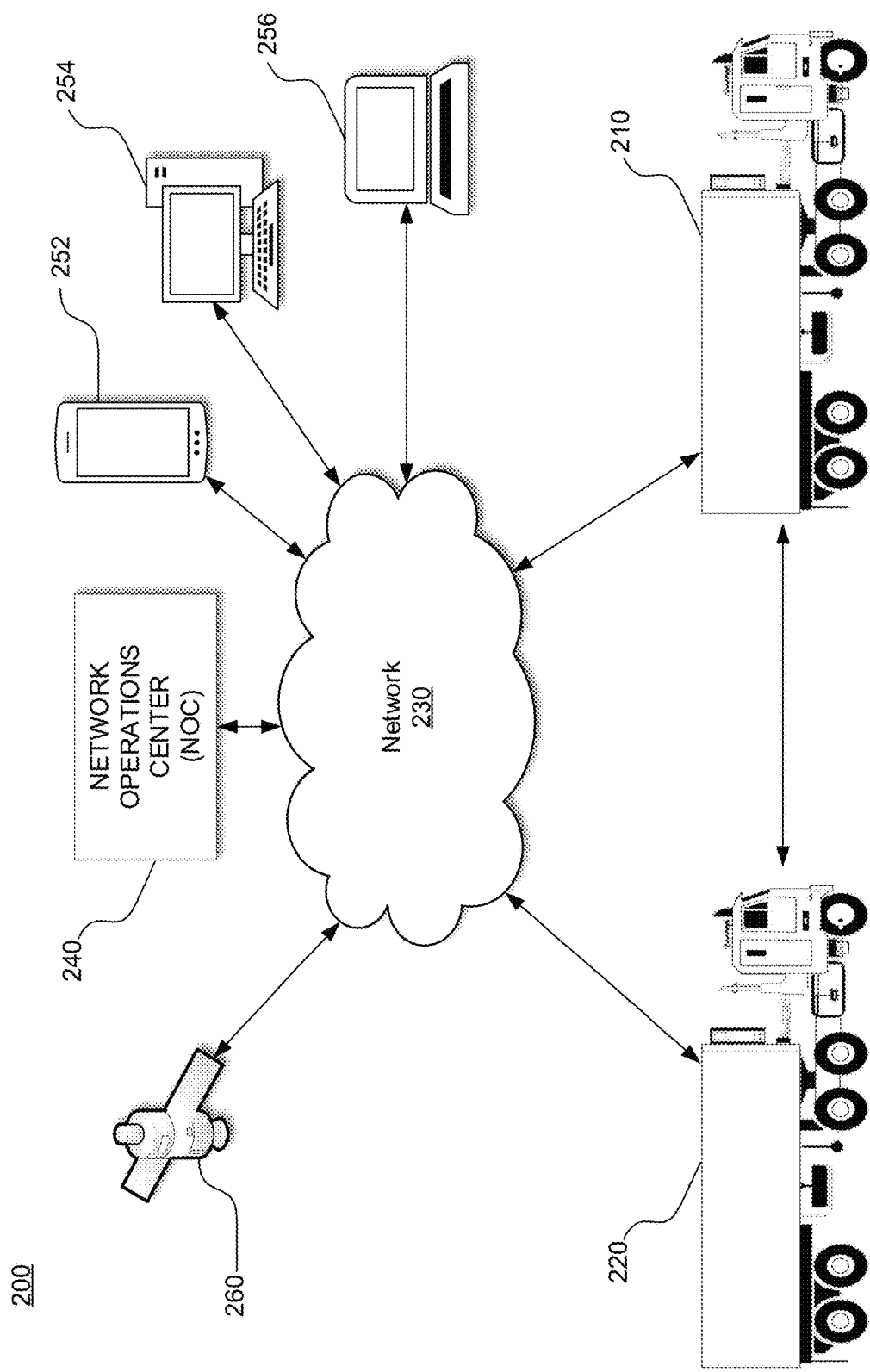
FIG. 2 illustrates a diagram of a platooning system, in accordance with some embodiments.

FIG. 2 illustrates an example system 200 including two vehicles capable of platooning and associated communication links. Vehicles 210 and 220 are depicted by trucks which are capable of platooning, and can communicate with each other directly or through network 230. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle (V2V) communications. Of course, other communications protocols and channels may be used in addition to or in place of a DSRC link. For example, the inter-vehicle communications may additionally or alternatively be transmitted over a cellular communications channel such as 4G LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 2 also includes a network operations center (NOC) 240. NOC 240 may include one or more locations from which network monitoring, control, and/or management may be exercised over a communication network (e.g., the cloud/a multi-tenant environment). NOC 240 can oversee a complex network of vehicles, satellite communications, web applications, and/or management tools. Users of NOC 240 may be responsible for monitoring one or more networks, sub-networks, fleets of vehicles, and/or sub-fleets of vehicles that may require special attention to avoid degraded service. For example, NOC 240 may receive information about various vehicles 210 and 220 such as their locations and attributes, run various programs based on the received information, and send information back to vehicles 210 and 220, including indicating whether they are allowed to platoon.

In addition to NOC 240, client devices 252 (e.g., a smartphone or tablet), 254 (e.g., a desktop computer or terminal), and 256 (e.g., a laptop computer or terminal) may be used to send and/or receive information about vehicles 210 and 220, NOC 240, or information from canonical sources such as the Internet (e.g., Google Maps or another online map provider, a traffic provider, a weather provider, etc.). Client devices can be used to view attributes of vehicles 210 and 220 such as their location, an estimate of their weight, their speed, an amount of engine torque, amount of applied break, a destination, etc.

FIG. 2 also includes a satellite 260, which can send signals to network 230, NOC 240, and/or vehicles 210 and 220. Satellite 260 may be part of a satellite navigation system such as a global navigation satellite system (GNSS). GNSSs include the United States's Global Positioning System (GPS), Russia's GLONASS, China's BeiDou Navigation Satellite System, and the European Union's Galileo. Based on information sent from satellite 260, systems described herein can determine locations of vehicles 210 and 220.

Of course, it should be appreciated that the system described in FIG. 2 is only an example, and that many other configurations may exist. For example, a NOC may assist with the monitoring and control of hundreds or thousands of vehicles, and many types of web applications may exist.

Figure 3:
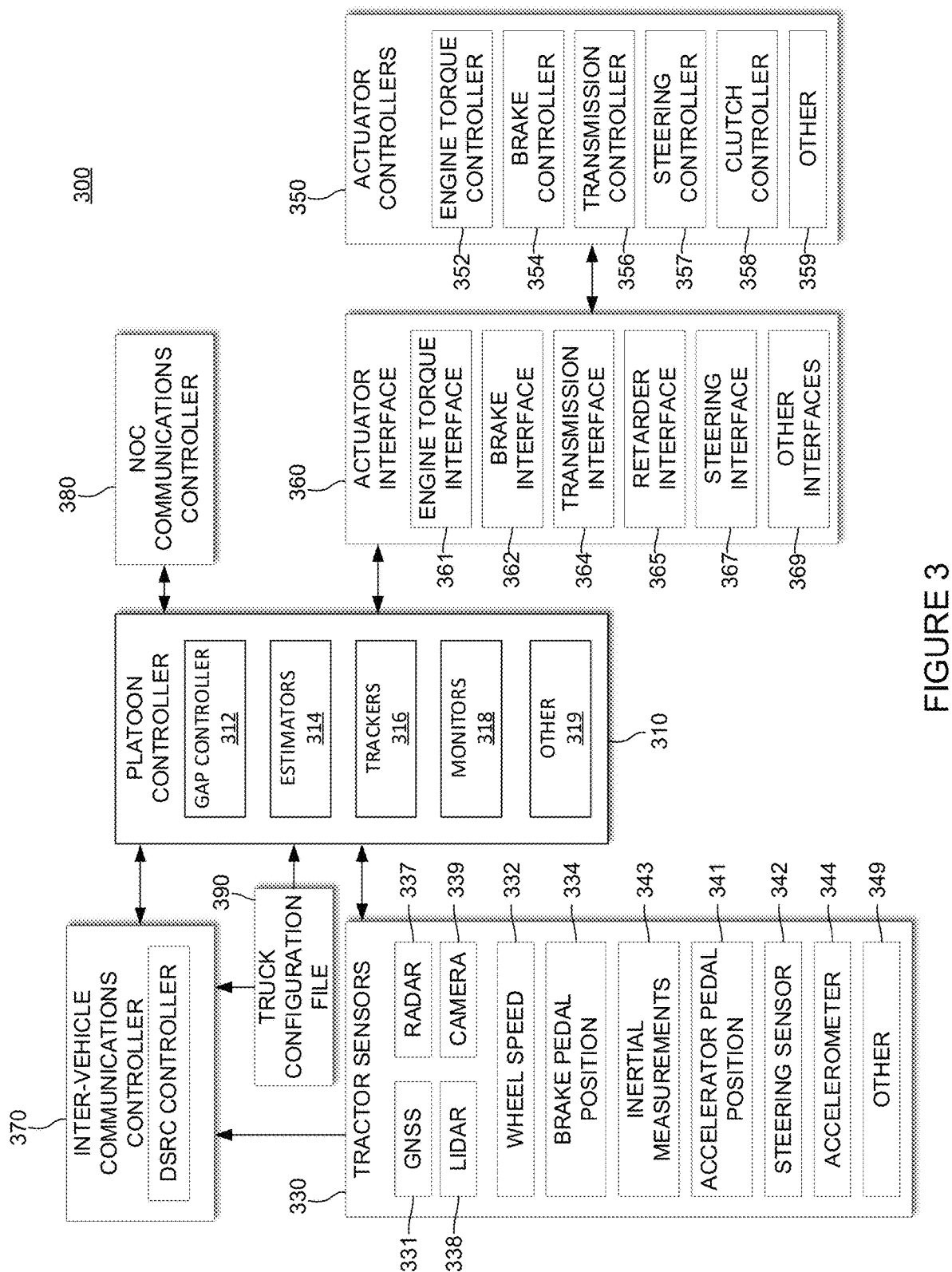
FIG. 3 illustrates a block diagram of a platooning system, in accordance with some embodiments.

FIG. 3 illustrates and example system 300 including a platoon controller 310 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 3 illustrates components of one possible configuration.

FIG. 3 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle. In some embodiments the driver of the rear vehicle may be responsible for steering the rear vehicle, but the platoon controller 310 is primarily responsible for controlling the rear vehicle's torque and braking requests during active platooning. However, as discussed herein, it should be appreciated that generally similar control schemes can be used in systems which contemplate more automated control of one or both of the platoon partners or which utilize vehicle control commands other than or in addition to torque and braking requests.

In the example embodiment illustrated in system 300, a platoon controller 310, receives inputs from a number of sensors 330 on the tractor and/or one or more trailers or other connected units, and a number of actuator controllers 350 (also referred to as electronic control units or ECUs) arranged to control operation of the tractor's powertrain and other vehicle systems. An actuator interface 360 may be provided to facilitate communications between the platoon controller 310 and the actuator controllers 350. In some embodiments, one or more of the actuator interfaces 360 may be included in one or more of the actuator controllers 350 (e.g., an actuator interface may be included in an ECU). Platoon controller 310 also interacts with an inter-vehicle communications controller 370 (also referred to as an inter-vehicle communications ECU) which orchestrates communications with the platoon partner and a NOC communications controller 380 (also referred to as a NOC communication ECU) that orchestrates communications with a NOC. The vehicle also may have selected configuration files 390 that include known information about the vehicle.

Some of the functional components of the platoon controller 310 include gap controller 312, a variety of estimators 314, one or more partner vehicle trackers 316 and various monitors 318. In many applications, the platoon controller 310 will include a variety of other components 319 as well.

Some of the sensors utilized by platoon controller 310 may include GNSS unit 331, wheel speed sensors 332, inertial measurement devices 334, radar unit 337, lidar unit 338, cameras 339, accelerator pedal position sensor 341, steering wheel position sensor 342, brake pedal position sensor 343, and various accelerometers 344. Of course, not all of these sensors will be available on all vehicles involved in a platoon and not all of these sensors are required in any particular embodiment. A variety of other sensors 349 (now existing or later developed or commercially deployed) may be additionally or alternatively be utilized by platoon controller 310 in other embodiments.

Many (but not all) of the described sensors, including wheel speed sensors 332, radar unit 337, accelerator pedal position sensor 341, steering wheel position sensor 342, brake pedal position sensor 343, and accelerometer 344 are relatively standard equipment on newer trucks (tractors) used to pull semi-trailers. However, others, such as GNSS unit 331 and lidar unit 338 (if used) are not currently standard equipment on such tractors or may not be present on a particular vehicle and may be installed as needed or desired to help support platooning.

FIG. 3 also illustrates various actuator controllers 350. It should be understood that, in various embodiments, some or all types of controllers may be referred to interchangeably as electronic control units (ECUs). ECUs will be described in further detail with regard to FIGS. 4 and 5. It should, however, be understood that some ECUs may control actuators, some ECUs may control communications, some ECUs may monitor sensors, and some may perform any combination thereof. Thus, it should be appreciated that the system shown in FIG. 3 is merely one of a wide variety of systems that may be used to control platooning.

Some of the vehicle actuator controllers 350 that platoon controller 310 may direct at least in part include engine torque controller 352; brake controller 354; transmission controller 356; steering/automated steering controller 357; and clutch controller 358. Of course, not all of these actuator controllers will be available or are required in any particular embodiment and it may be desirable to interface with a variety of other vehicle actuator controllers 359 that may be available on the vehicle as well. Therefore, it should be appreciated that the specific actuator controllers 350 directed or otherwise utilized by the platoon controller on any particular controlled vehicle may vary widely. Further, the capabilities of any particular actuator controller (e.g. engine torque controller 352), as well as its interface (e.g., the nature and format of the commands, instructions, requests and messages it can handle or generate) will often vary with the make and model of that particular actuator controller. Therefore, an actuator interface 360 is preferably provided to translate requests, commands, messages and instructions from the platoon controller 310 into formats that are appropriate for the specific actuator controller hardware and software utilized on the controlled vehicle. The actuator interface 360 also provides a mechanism for communicating/translating messages, commands, instructions and requests received from the various actuator controllers back to the platoon controller 310. In some embodiments, an appropriate actuator interface may be provided to interact with each of the specific vehicle controllers utilized. In various embodiments, this may include one or more of: an engine torque interface 361; a brake interface 362; a transmission interface 364; a retarder interface 365; a steering interface 367; and/or any other appropriate controller interface 369. In some embodiments, various controllers may be combined (e.g., in the case of a chasses controller, or an engine ECU that also controls a retarder—obviating the need for a retarder ECU).

Large trucks and other heavy vehicles frequently have multiple systems for "braking" the truck. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder may be controlled by the engine torque controller 352 and in such embodiments, the retarder can be controlled by sending appropriate torque commands (which may be negative) to engine torque controller 352. In other embodiments a separate retarder controller (not shown) may be accessible to, and therefore directed by, platoon controller 310 through an appropriate retarder interface 365. In still other embodiments, the platoon controller 310 may separately determine a retarder command that it sends to the actuator interface 360. In such embodiments the actuator interface will interpret the retard command and pass on appropriate retardation control commands to an Engine ECU or other appropriate vehicle controller.

The communications between vehicles may be directed over any suitable channel and may be coordinated by inter-vehicle communications controller 370. As described above, the DSRC protocol may work well.

The specific information transmitted back and forth between the vehicles may vary widely based on the needs of the controllers. In various embodiments, the transmitted information may include the current commands generated by the platoon controller 310 such as requested/commanded engine torque, and/or requested/commanded braking deceleration 382. They may also include steering commands, gear commands, etc. when those aspects are controlled by platoon controller 310. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the tractor sensor information provided to platoon controller 310 is also transmitted to the platoon partner and corresponding information is received from the platoon partner so the platoon controllers 310 on each vehicle can develop an accurate model of what the partner vehicle is doing. The same is true for any other relevant information that is provided to platoon controller 310, including any vehicle configuration information 390 that is relevant to platoon controller 310. It should be appreciated that the specific information transmitted may vary widely based on the requirements of platoon controllers 310, the sensors and actuators available on the respective vehicles, and the specific knowledge that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 310. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, satellite communications networks and/or any of a variety of other networks as appropriate. The communications with the NOC may be coordinated by NOC communications controller 380. The information transmitted to and/or received from the NOC may vary widely based on the overall system design. In some circumstances, the NOC may provide specific control parameters such as a target gap. These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 310. The NOC may also provide information about the partner vehicle including its configuration information and any known relevant information about its current operational state such as weight, trailer length, etc.

Lastly, with regard to FIG. 3, configuration file 390 may include a wide variety of information about the host vehicle that may be considered relevant to controller 310. By way of example, some of the information might include the vehicle's specification including such things as engine performance characteristics, available sensors, the existence and/or type of platooning indicators (e.g., lights that indicate a vehicle is platooning), the nature of its braking system, the location of its GNSS antenna relative to the front of the cab, gear ratios, differential ratios etc.

Figure 4:
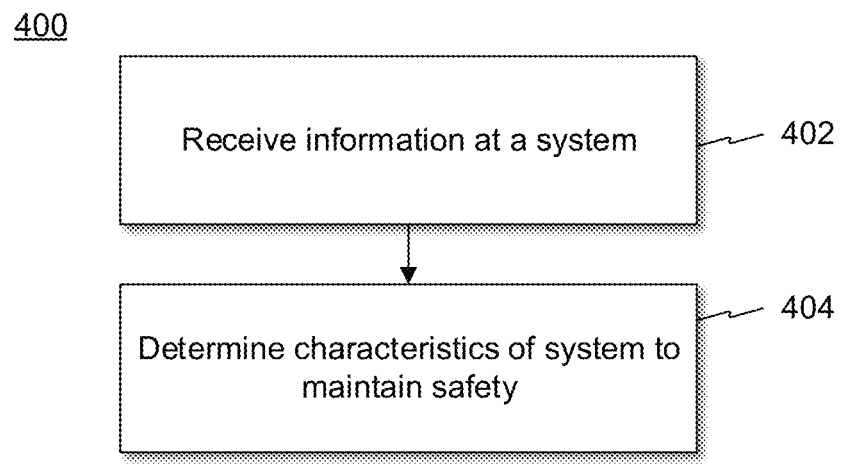
FIG. 4 illustrates a block diagram of a system including an electronic control unit, in accordance with some embodiments.

FIG. 4 illustrates a sample method for determining whether a system is safe. Flowchart 400 starts by receiving information at step 402. This information may be received by a system that may include a simulator (e.g., an automated driving and/or platooning simulator). At step 402, characteristics of a vehicle or system may be determined, and that information can be used to determine how to maintain safety.

In step 402, information is received in a system. Such information, may be included in the list of attributes below (also referred to as ATTRIBUTE LIST 1). In step 404, the characteristics of the system may be determined to maintain safety. For example, system may dissolve a platoon if certain information about one or more of the following attributes (including combinations thereof) is received by the system.

ATTRIBUTE LIST 1: These attributes include, but are not limited to: data associated with a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next planned stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, intervening traffic (e.g., cut-ins, also referred to as the situation when a vehicle enters an area between a lead vehicle and a rear vehicle).

In some embodiments a platooning gap can be determined that will improve efficiency and maintain safety. To determine whether something is safer than another, in some cases a benchmark must be determined. In some embodiments knowing braking variability can be determined to assist with an analysis. In some embodiments, braking variability can be analyzed to determine the brakes influence on the ability of a vehicle to avoid a collision (1) during a lead vehicle hard braking (e.g., a quick and/or full/semi-full brake depression) event, and/or (2) during a lead truck collision event (e.g., when the lead vehicle collides with an object. In some embodiments, these techniques may be compared to each other, and/or other systems such as one or more adaptive cruise control systems (ACC) and/or collision mitigation systems (CMS).

When determining a benchmark, a standard should be created. This standard may be based on the premises that its bounds cannot be too low or too high. Setting a benchmark unreasonably low could result in avoidable incidents that unnecessarily hamper adoption of the technology. Setting a benchmark unreasonably high could result in irrational requirements that artificially hamper adoption of the technology.

In some embodiments, retrieving data from a canonical source may assist in developing a system to analyze whether a vehicle system is safe (e.g., a platooning system). Such a canonical source may be from other analyses performed by various organizations, such as the FMCSA collision data available online. In some embodiments, "collisions" may be the safety benchmarking metric.

In some embodiments, data retrieved from sources that analyze automated vehicle incidents/collisions may be used to base platooning safety estimates one. For example, the California DMV may provide data on automated vehicles (without any platooning data), and a system may use that data to determine/estimate attributes of platooning vehicles such as their stopping distances, types of brakes, etc.

For example, in some embodiments a system may determine whether a vehicle is safe to go on a road (either in a simulator or in the physical world) by assessing whether at least a portion of a trailers brakes have an automated braking system (ABS).

Knowing/determining/estimating such information, along with other information and systems and attributes included herein, could be relied on in a safety analyses to estimate/predict residual risk as a collision rate for comparison to a benchmark.

Also, if vehicles are on a road, performance and safety incidents could be measured. For example, incidents based on gap size/time could be shown on a graph, as in FIG. 5.

Figure 5:
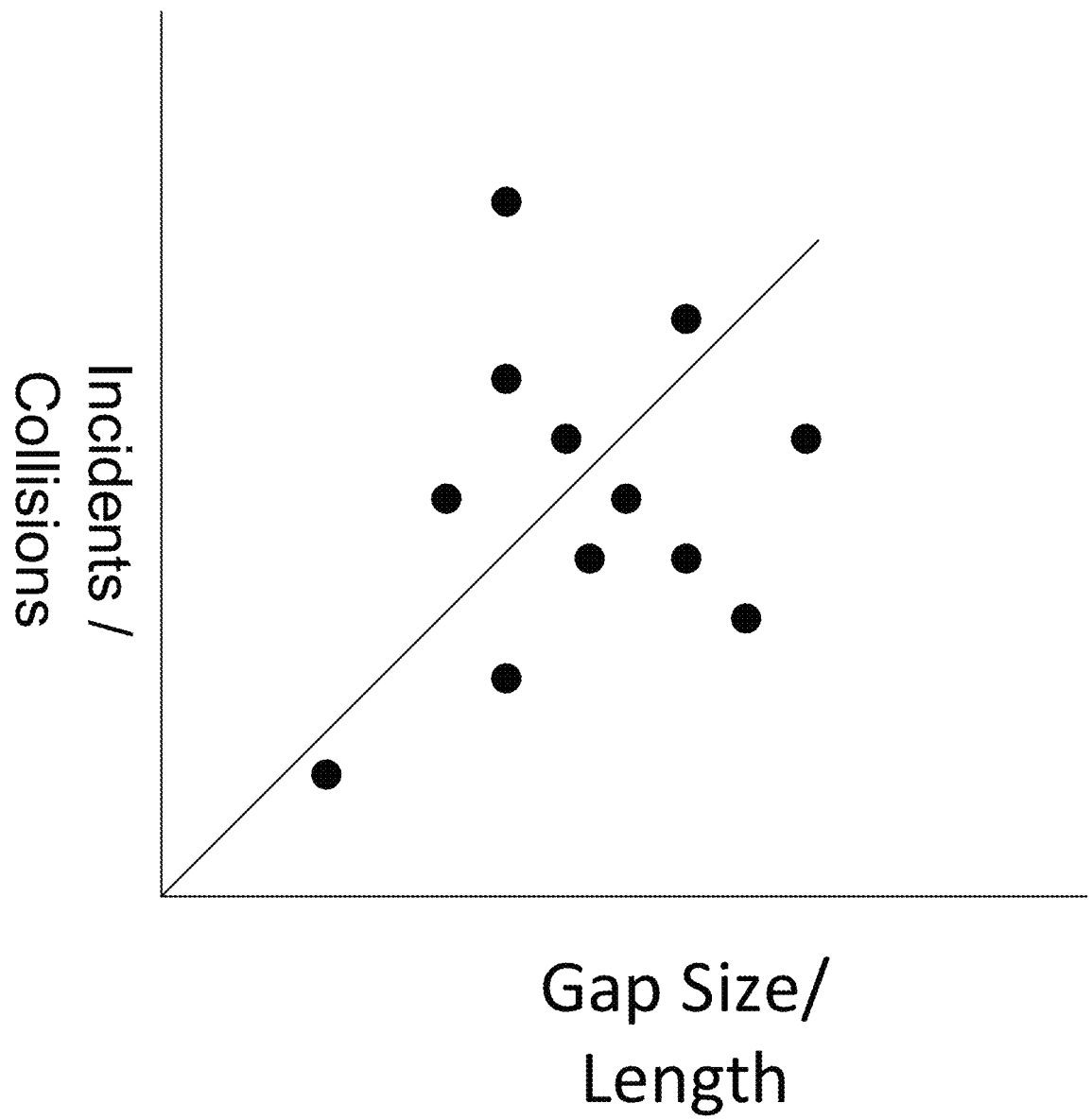
FIG. 5 illustrates a graph, in accordance with some embodiments.

FIG. 5 shows a graph comparing incidents/collisions to a gap's size/length (because a gap may be a distance or a time). In various embodiments herein, to determine that a system has a particular amount of safeness (e.g., at least a threshold amount of safeness, wherein safeness is measured at least in part by incidents/collisions). For example, the system referenced in FIG. 4 may maintain safety if a certain characteristic, such as gap size/length results in more or fewer incidents/collisions than a threshold amount of incidents/collisions.

Characteristics that may be used as inputs when creating a simulator to determine/optimize safety of a vehicle and/or platooning vehicles, creating a model to determine whether a configuration/system is safe, to see if various characteristics cause particular results, or otherwise used for systems, may include, but are not limited to: data associated with a/an: position, latitude, longitude, altitude, heading, speed, longitudinal and lateral acceleration, relative angle, type of load (e.g., type of materials a vehicle is carrying), brake status, brake pressure, path history, path projection, travel plans, vehicle size, vehicle type, brake type, current operating mode (autonomous or manual), map data, traffic information, GPS augmentation information (e.g., delays from infrastructure), wheel speed, wheel torque, gross torque, net torque, wind, rain, music, video, infotainment system, suspension, axle weight(s), transmission status (e.g., what gear the vehicle is in, what gear the vehicle was in, what gears the vehicle transferred from and to (e.g., fifth gear to fourth gear)), previous transmission status, battery, electronic throttle control, throttle pedal, brake pedal, power steering, adaptive cruise control, a blowout, interior lighting, exterior lighting, retarder, anti-lock brakes, emergency braking, engine governor, powertrain, gear ratio, wheel size, wheel type, trailer length, trailer type, trailer height, amount of trailers, trailer position, current trailer position, past trailer position, tractor type, tractor height, transceiver type, current fuel, next planned stop, projected miles remaining until fuel tanks are empty, malfunctions, turn signals, LIDAR, radar, ultrasonic sensors, road surface, wheel angle, tire pressure, cabin temperature, engine temperature, trailer interior temperature, camera, fleet of vehicles, NOC, computer vision, other vehicle traveling in the same direction, other vehicle traveling in an opposite direction, intervening traffic (e.g., cut-ins, also referred to as the situation when a vehicle enters an area between a lead vehicle and a rear vehicle).

Additional attributes of a system (also referred to as ATTRIBUTES LIST 2) may be used for any purpose described herein, such as determining whether a system is safe (e.g., as in FIG. 4), a gap set point selection, control, and/or positioning within a platoon:

Attributes List 2
1. Vehicle characteristics
    a. Brakes
        I. Type (disc/drum)
        II. Chamber sizes
        III. ABS
            1. Yes/no
            2. Channels
            3. Version
        IV. Supply pressure
        V. Pads/shoes
            1. Type
            2. Age
        VI. Slack adjuster settings
        VII. Temperature
        VIII. Wet/dry
    b. Tires
        I. Type
        II. Tread wear
        III. Age/miles
        IV. Temperature
        V. Pressure
    C. Engine
        I. Power/Torque
            1. At current RPM
            2. At other RPMs
        II. Limitations from emissions or faults
    d. Transmission
        I. Gear ratios
        II. Shifting speed or capability
    e. Suspension
        I. Air vs spring
        II. Geometry
    f. Aerodynamics
        I. Trailer
            1. Whether Trailer tails are installed
            2. Trailer tail position
        II. Tractor
            1. Presence or absence and type of Roof fairing on the tractor
            2. Wheel covers
2. Road characteristics
    a. Curvature
        I. Horizontal
        II. Vertical
    b. Lane width
    c. Whether the road is a Divided road
    d. Whether the road has Controlled access
    e. Speed limit
    f. Surface type
3. Weather
    a. Rain
    b. Ice or potential ice
    C. Temperature
    d. Humidity
    e. Fog
    f. Lightning
    g. Wind
        I. Speed
        II. Direction
        III. Gustiness
4. Traffic
    a. Average speed of flow
    b. Density
    c. All above per lane or total
5. System Characteristics
    a. Software version
    b. HW setup
        I. Sensor type
    c. System health
6. Regulatory
    a. Legal following distance
    b. Specific provisions
        I. Allow cut-ins
        II. Increased gap at crest of hill
    c. Geographic distinctions
        I. Longer distance in city areas
        II. Bridges
        III. Tunnels
7. Driver
    a. Driver record
        I. Collisions
        II. Citations
        III. Roadside inspections
    b. Experience
        I. Total driving
        II. Platooning driving c. Company they work for
d. Hours of service
  I. Regulatory definition
  II. How long have they really been driving
  III. How long have they been platooning
8. Cargo
a. Hazmat
b. Refrigerated
c. Tanker
  I. Baffled
  II. Unbaffled
9. Business
a. Carrier(s)
b. Shipper(s)
10. Calculated (may overlap with other categories)
a. Stopping distance
b. Power to weight ratio
c. Available power to weight ratio (after road load removed)

Additional factors governing gap settings and platoon pairing selection and order may be found in U.S. Provisional Patent Application Ser. No. 62/531,293, filed Jul. 11, 2017, and 62/639,297, filed on Mar. 6, 2018, which are hereby incorporated by reference in their entirety (for information included therein, not only the attributes listed above (ATTRIBUTES LIST 1 and ATTRIBUTES LIST 2).

As an example of what these attributes may be used for, in some embodiments it is contemplated that a system may determine whether the predicted rate of collision when platooning is lower than the same truck equipped only with CMS.

In some embodiments, a system may implement a probabilistic approach to determining a target gap. Test data may be assessed to determine potential sources of brake variation, how to apply the results to the system, etc. In absence of standard, industry may need to develop a method for determining min platooning gap.

Figure 6:
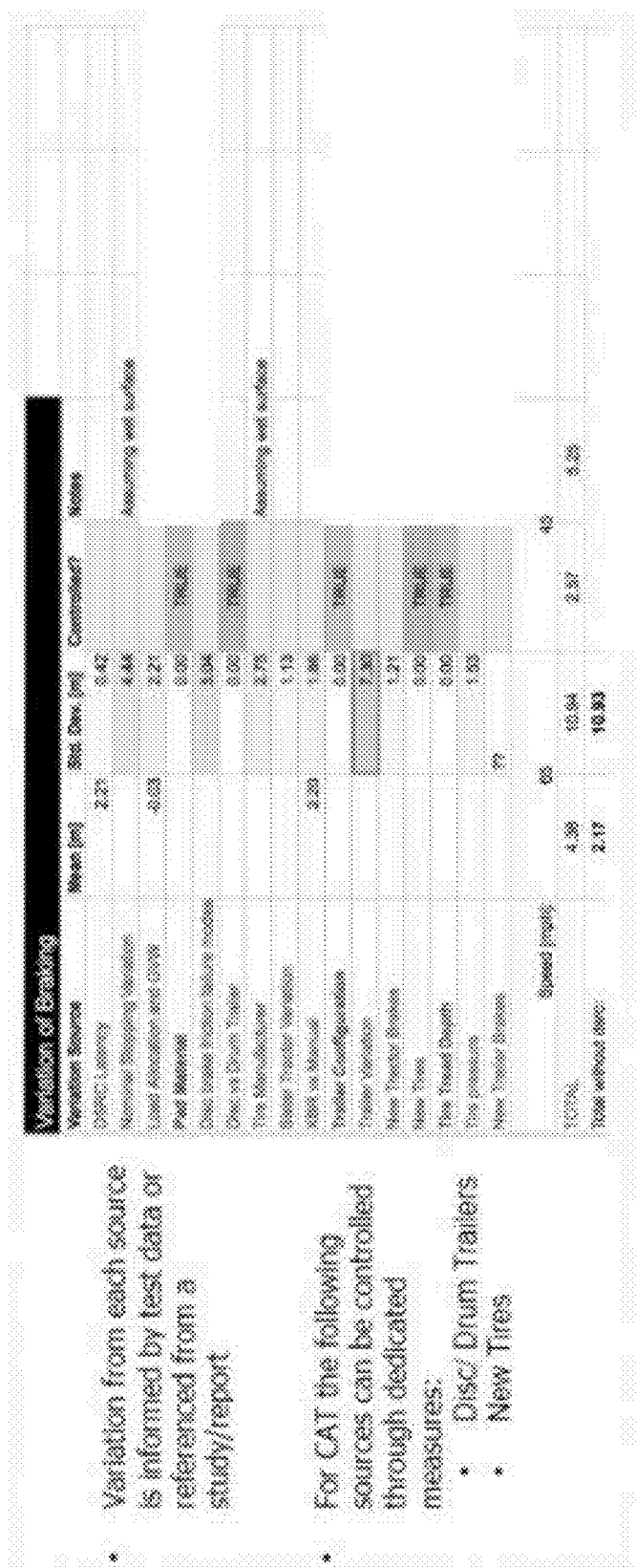
FIG. 6 illustrates information used to determine the safety of a vehicle, in accordance with some embodiments.

FIG. 6 illustrates information 600 used to determine the safety of a vehicle, in accordance with some embodiments. FIG. 6 shows an example chart indicating the variations of braking and/or stopping based on various attributes. Although specific attributes are shown, other attributes or combinations of attributes included in lists ATTRIBUTES LIST 1 and ATTRIBUTES LIST 2 above may be used to determine braking variations. For example, a wet road and a tire pressure may be used to determine braking variations, which may be used to determine an amount of safety of a system, and whether that amount of safety is above a threshold amount of safety. In some embodiments, if the amount of safety is below a threshold level, an adverse action may occur such as a dissolve or a disability of a vehicle to platoon.

Figure 7:
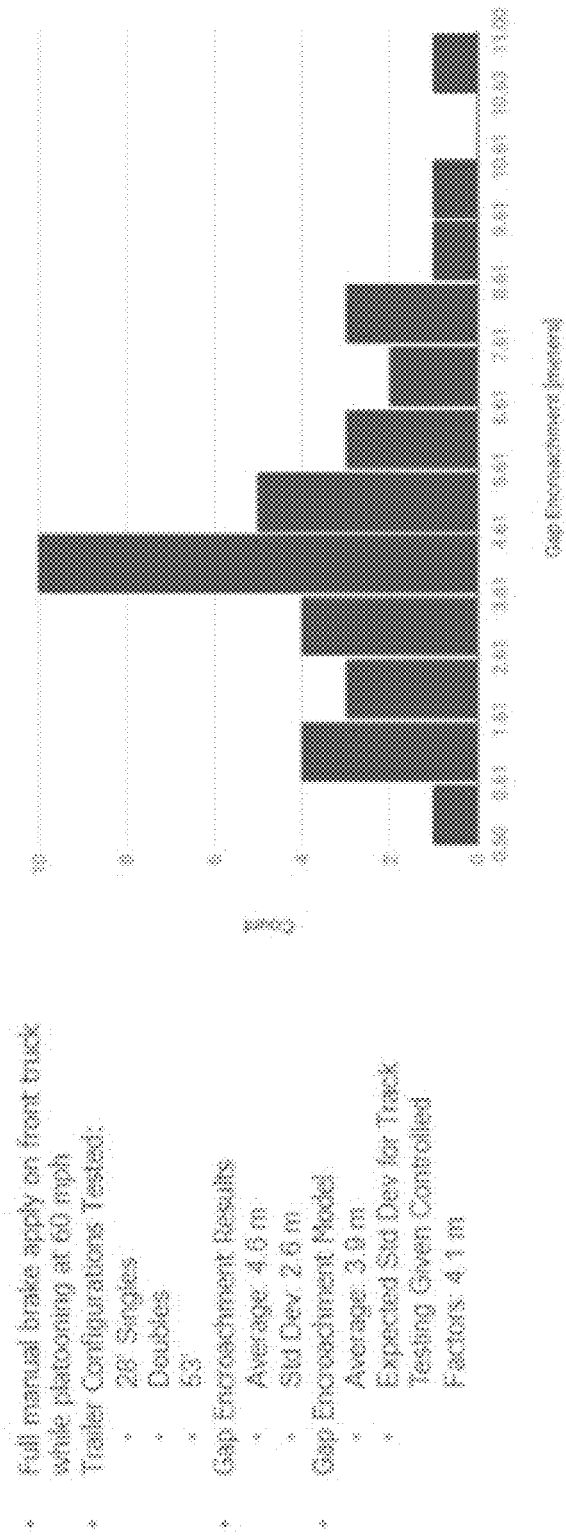
FIG. 7 illustrates information used to determine the safety of a vehicle, in accordance with some embodiments.

FIG. 7 illustrates information 700 used to determine the safety of a vehicle, in accordance with some embodiments. FIG. 7 shows an example chart indicating configurations of vehicles and that may be tested to determine an amount of safety. Although specific attributes are shown (e.g., 28' singles), other attributes or combinations of attributes included in lists ATTRIBUTES LIST 1 and ATTRIBUTES LIST 2 above may be used to determine an amount of safety.

FIG. 8 illustrates information 800 used to determine the safety of a vehicle, in accordance with some embodiments. FIG. 7 shows an example chart that describes simulations and the attributes used therein (e.g., ACC+AEB w/o Driver). Although specific attributes are shown, other attributes or combinations of attributes included in lists ATTRIBUTES LIST 1 and ATTRIBUTES LIST 2 above may be used to determine an amount of safety.

FIG. 9 illustrates information 900 used to determine the safety of a vehicle, in accordance with some embodiments. FIG. 9 shows an example chart that describes driver models and the attributes used therein (e.g., driver applying 0.7 g capacity breaking). Although specific attributes are shown, other attributes or combinations of attributes included in lists ATTRIBUTES LIST 1 and ATTRIBUTES LIST 2 above may be used to determine an amount of safety.

FIG. 10 illustrates information 1000 used to determine the safety of a vehicle, in accordance with some embodiments. FIG. 10 shows an example chart that describes example attributes that contribute to an example safe system (e.g., an incorrect ordering a platooning vehicles may cause a dissolve or prohibit platooning). Although specific attributes are shown, other attributes or combinations of attributes included in lists ATTRIBUTES LIST 1 and ATTRIBUTES LIST 2 above may be used to determine an amount of safety.

FIG. 11 illustrates information 1100 used to determine the safety of a vehicle, in accordance with some embodiments. FIG. 11 shows an example chart that describes example attributes that contribute to an example safe system (e.g., constraining the system to only use drum brakes on a trailer or dolly). Although specific attributes are shown, other attributes or combinations of attributes included in lists ATTRIBUTES LIST 1 and ATTRIBUTES LIST 2 above may be used to determine an amount of safety.

Figure 12:
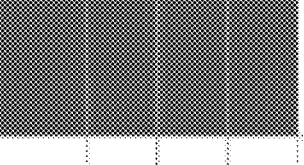
FIG. 12 illustrates information used to determine the safety of a vehicle, in accordance with some embodiments.

FIG. 12 illustrates information 1200 used to determine the safety of a vehicle, in accordance with some embodiments. FIG. 12 shows an example chart that describes example attributes that contribute to an example safe system (e.g., constraining the system to only use drum brakes on a trailer or dolly). Although specific attributes are shown, other attributes or combinations of attributes included in lists ATTRIBUTES LIST 1 and ATTRIBUTES LIST 2 above may be used to determine an amount of safety.

FIG. 13 illustrates information 1300 used to determine the safety of a vehicle, in accordance with some embodiments. FIG. 13 shows an example chart that describes example attributes that contribute to an example safe system (e.g., constraining the system to only operate in Texas and Tennessee). Although specific attributes are shown, other attributes or combinations of attributes included in lists ATTRIBUTES LIST 1 and ATTRIBUTES LIST 2 above may be used to determine an amount of safety.

FIG. 14 illustrates information 1400 used to determine the safety of a vehicle, in accordance with some embodiments. FIG. 14 shows an example chart that describes example attributes that contribute to an example safe system (e.g., ensuring trained drivers are operating platoons). Although specific attributes are shown, other attributes or combinations of attributes included in lists ATTRIBUTES LIST 1 and ATTRIBUTES LIST 2 above may be used to determine an amount of safety.

FIG. 15 illustrates information 1500 used to determine the safety of a vehicle, in accordance with some embodiments. FIG. 15 shows an example chart that describes example attributes that contribute to an example safe system (e.g., that a gap setting is based on brake characterizations). Although specific attributes are shown, other attributes or combinations of attributes included in lists ATTRIBUTES LIST 1 and ATTRIBUTES LIST 2 above may be used to determine an amount of safety.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC, to various ECUs, and to one or more processors. According to various aspects, each of these items may include various kinds of memory, including non-volatile memory, to store one or more programs containing instructions for performing various aspects disclosed herein.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface. Various functions described herein may be provided through a remote desktop environment or any other cloud-based computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:

1. A method for determining whether to perform an adverse action, comprising:
    establishing a wireless link between a first vehicle and a second vehicle, wherein information about the engine torque of the first vehicle and braking system of the first vehicle are transmitted to the second vehicle via the wireless link;
    determining a threshold safety level, wherein the threshold safety level is based at least in part on a gap size and determined by:
        generating a first simulation scenario modeling vehicle behavior under a first set of assumptions,
        generating a second simulation scenario modeling vehicle behavior under a second set of assumptions different from the first set of assumptions, and
        analyzing outcomes of the first simulation scenario and the second simulation scenario to establish the threshold safety level; and
    in response to the first vehicle or the second vehicle determining that a current safety level of the first vehicle and the second vehicle do not exceed the threshold safety level, performing the adverse action, wherein the threshold safety level comprises sufficient deceleration necessary to avoid a collision, at the first vehicle, as detected by both a platoon electronic control unit (PECU) and a brake electronic control unit (BECU) on the first vehicle.

2. The method of claim 1, wherein performing the adverse action comprises:
    determining whether the first and second vehicle are engaged in a platoon;
    in response to the first vehicle and the second vehicle being engaged in the platoon, dissolving the platoon; and
    in response to the first and second vehicle not being engaged in the platoon, prohibiting the first vehicle and the second vehicle from platooning.

3. The method of claim 2, wherein the safety level is determined based at least in part on whether the first and second vehicles include ABS brakes, and the versions of the ABS brakes.

4. The method of claim 2, wherein the threshold safety level is determined by the platooning electronic controller (PECU), and wherein the PECU is configured to send commands to a braking ECU (BECU) and an engine ECU (EECU).

5. The method of claim 4, wherein the PECU is further configured to send commands to a transmission electronic controller (TECU).

6. The method of claim 2, wherein the threshold safety level is determined by the platooning electronic controller (PECU), and wherein the PECU is configured to at least in part control a braking ECU (BECU) and an engine ECU (EECU).

* * * * *